Figure 1:
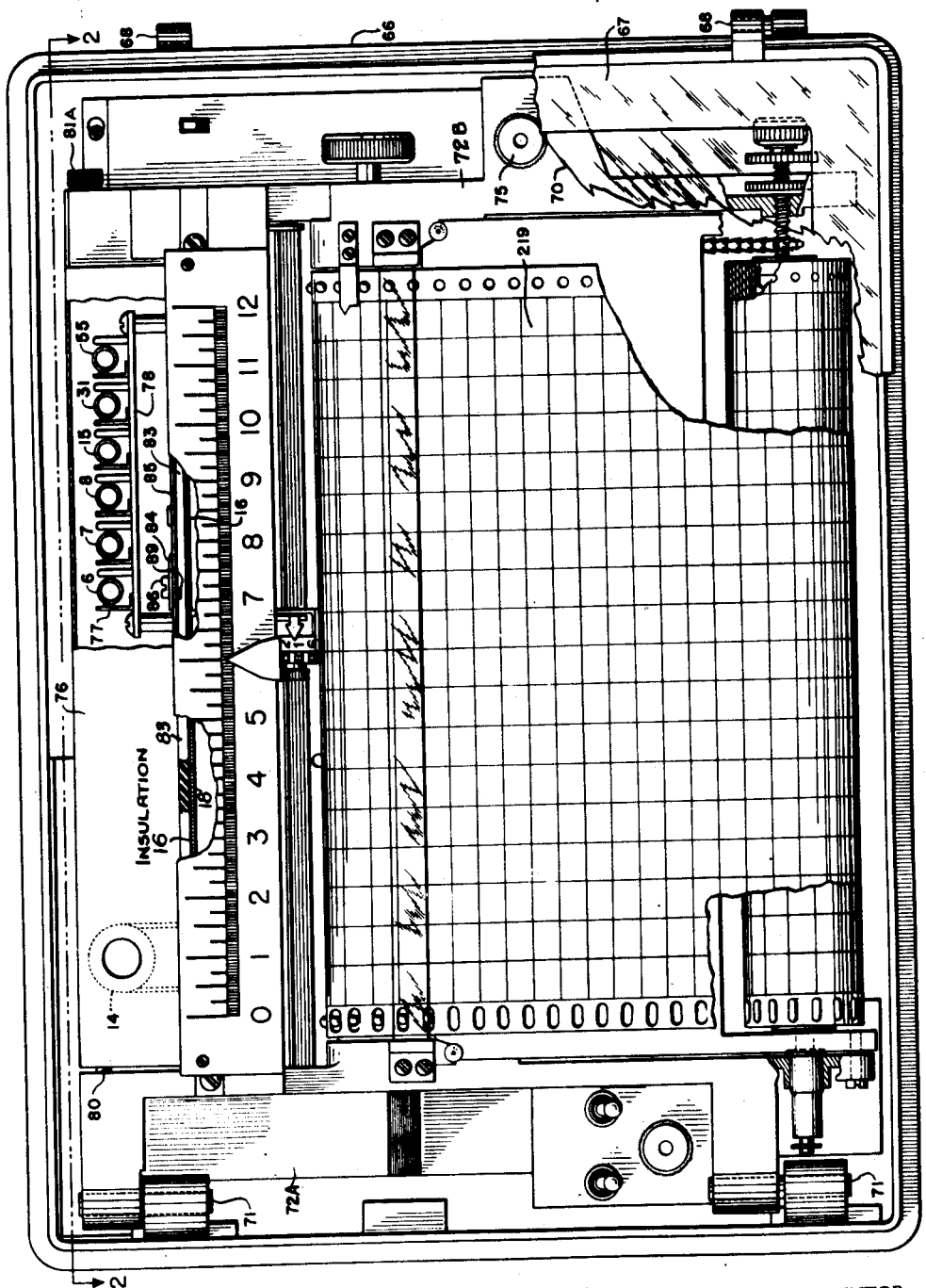

Oct. 17, 1950    J. A. CALDWELL    2,526,196
POTENTIOMETER INSTRUMENT
Original Filed June 20, 1942    2 Sheets-Sheet 1

INVENTOR.
JOHN A. CALDWELL
BY
ATTORNEY

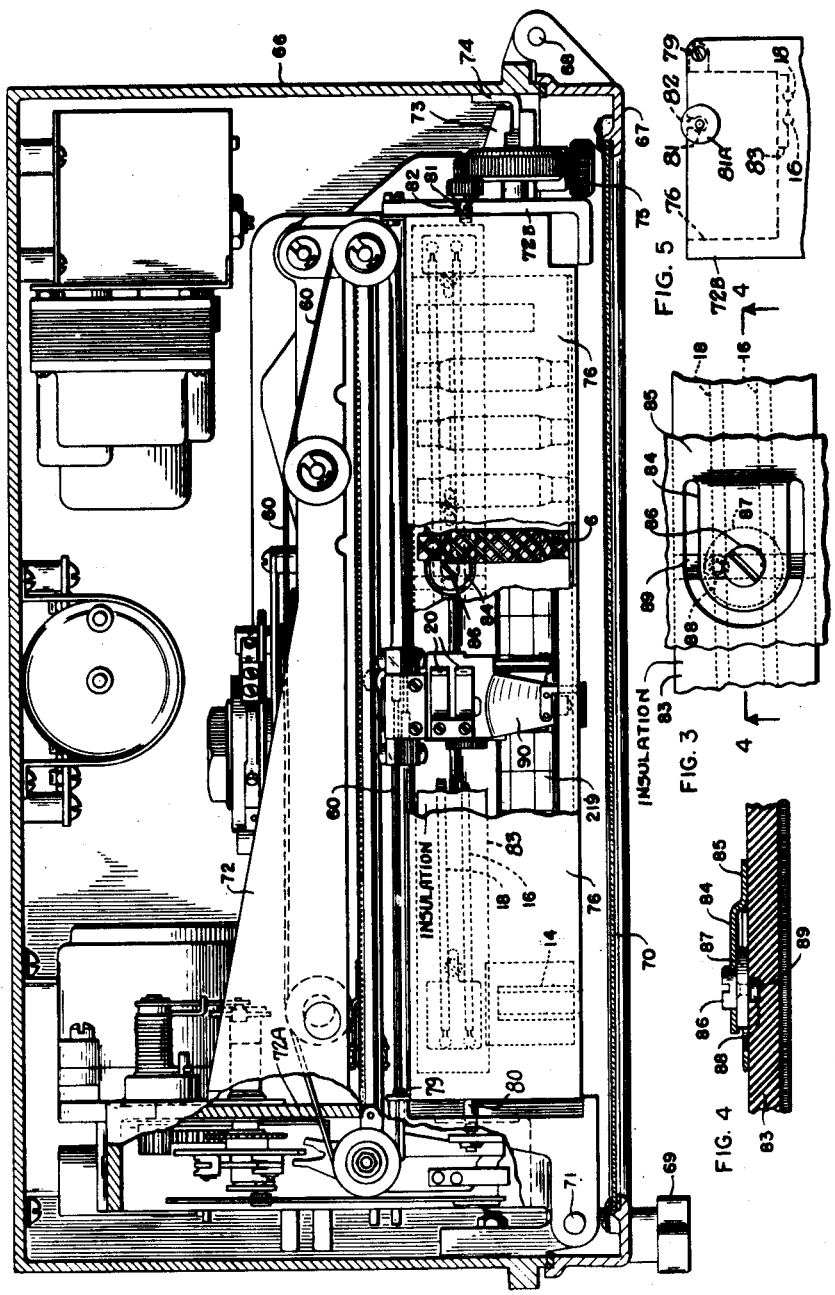

Patented Oct. 17, 1950

2,526,196

UNITED STATES PATENT OFFICE 2,526,196

POTENTIOMETER INSTRUMENT

John A. Caldwell, Philadelphia, Pa., assignor, by mesne assignments, to Minneapolis-Honeywell Regulator Company, Minneapolis, Minn., a corporation of Delaware Original application June 20, 1942, Serial No. 447,863, now Patent No. 2,423,480, dated July 8, 1947. Divided and this application October 24, 1946, Serial No. 705,302

2 Claims. (Cl. 201—48)

The present application is a division of my copending application Serial Number 447,863, filed on June 20, 1942, now Patent 2,423,480, issued July 8, 1947. That application is directed generally to the features of a self-balancing potentiometer of the strip chart type, while the present application is specifically directed to a support and casing to which the slidewire is attached and in which the calibrating and compensating resistances are located.

As is well known, a potentiometer mechanism is provided with a slidewire and a plurality of calibrating and compensating resistances which are joined together to form a potentiometer network. It is highly desirable that these elements of the potentiometer network be both easily accessible for cleaning and replacement and that they be located adjacent each other so that they will be maintained at substantially the same temperature. In the potentiometer instrument of the present invention provision is made to secure these desiderata by placing the various resistances in a metal casing and attaching the slidewire to the bottom of the casing. The casing is then placed in the instrument in such a fashion that it may be moved around an axis to a position in which the slidewire is accessible for cleaning. The mounting for the casing is so constructed that the casing will always be returned to exactly the same position after it has been moved.

It is an object of the invention to provide a potentiometer instrument in which the various calibrating resistances and compensating resistances are located adjacent the slidewire so that they will all be at substantially the same temperature. This insures that the instrument will not be subjected to inaccuracies due to temperature variations between the different parts.

It is a further object of the invention to mount the various resistances and the slidewire of a potentiometer instrument in or on a casing to form a complete sub-assembly of the instrument. It is a further object of the invention to provide a movable support for the resistances and the slidewire of a potentiometer instrument which support can always be returned to exactly the same operative position in the instrument after it has been moved from that position.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Figure 1 is a front view of the instrument in its casing with certain portions broken away, Figure 2 is a top view of the instrument taken on lines 2—2 of Figure 1, Figure 3 is a detail of the slidewire adjusting means, Figure 4 is a view taken on lines 4—4 of Figure 3, and Figure 5 is a view of a portion of the frame looking from the right of Figure 3.

The details of the entire potentiometer instrument are fully described in the parent application, Serial Number 447,863, which was mentioned above. The description contained in the present specification will be restricted to that part of the instrument which shows and describes the material covered by the claims attached hereto. Reference is made to the parent application for further details which are not covered in this specification and which are not pertinent to the invention claimed herein.

As is well known, a self-balancing potentiometer network includes a plurality of electrical elements that are connected together electrically. Some of these elements are compensating and calibrating resistances while another is a slidewire along which a contact is moved in response to potentiometer unbalance to rebalance the same. The contact is moved relative to the slidewire by some relay mechanism that is responsive to unbalance of the potentiometer circuit. It is common to have all of these parts, both electrical and mechanical, located in an instrument casing. To this end there is provided a casing 66 which has a door 67 closing the front thereof. The door is hinged to the casing at 68 and is provided with a knob 69 by means of which it may be opened and closed. A suitable window 70 is formed in the door through which a recording chart and other parts may be viewed.

The elements located within the casing include an electric motor which is rotated in one direction or an opposite direction depending upon the direction of potentiometer unbalance. As the motor rotates it serves to move a cable 60 through suitable connections in one direction or another. This cable is passed around a series of pulleys to extend across the top of the instrument adjacent the front thereof. Attached to the cable is a print wheel carriage 90 that carries mechanism to print a record of the position of the print wheel carriage which is a record of the temperature under measurement. This record is made upon a chart 219 that is suitably mounted on the frame of the instrument and which is moved through the instrument by suitable means at a constant speed.

Attached to the print wheel carriage 90 is a pair of contacts 20 which engage the slidewire 18 and a parallel collecting bar 16 as the print wheel carriage is moved. The position of this contact along the slidewire and collecting bar when the potentiometer circuit is balanced is a measure of the value of the temperature. The present invention relates specifically to the manner in which the slidewire and the various resistances 6, 7, 8, 14, 15, 31, and 55 which form electrical portions of the potentiometer network are mounted in the instrument casing.

Located in the casing and hinged thereto at 71 is a swinging frame 72. This frame is mounted so that it can swing completely out of the casing, but may be locked into position in the casing by means of a latch 73 of the type shown in Williams Patent 2,283,304, issued May 19, 1942, which cooperates with a latch plate 74 attached to the right-hand side of the casing. This latch is actuated by a knob 75. The frame carries on it supporting members for all of the resistors that have been described above, as well as the chart, the printing mechanism, the detecting mechanism and other parts. The frame 72, as shown in Figure 2, is formed with a pair of mechanism supporting ends and a connecting part, that also has various parts mounted on it. For convenience in the following description, the left end of frame 72 in Figure 2 will be referred to as 72A while the right end will be referred to as 72B. The connecting part will continue to be referred to by the numeral 72.

On the upper front part of the frame 72 is a small sheet metal casing 76 that extends across the width of the instrument. This casing has in it supports 77 for various of the resistors as best shown in Figure 1. Each of these supports is attached to a plate 78 that may be bodily removed along with the resistors if it is desired to change the range of the instrument. In such case all of the resistors are removed as a unit, and a new set of resistors is placed in the casing. Also mounted in the casing 76 on the left-hand end thereof is the cold junction resistor 14. The sheet metal casing 76 is pivoted at 79 on the frame portions 72A and 72B so that it may be swung up for inspection and cleaning of the slidewire 16 and collector 18 which are attached to the bottom thereof. The casing is maintained in its normal position by a spring plunger 80 which is mounted in the frame 72A and cooperates with a small indentation on the left face of the casing. The right-hand end of the casing receives a threaded shaft 81 having a milled head 81A which has a conical face on it. When the casing is in operative position the shaft 81 lies as shown in Figure 5, in a groove 82 in the frame portion 72B.

Attached to the bottom of the casing 76 is a plate member 83 made of some insulating material to which are fastened the slidewire 16 and the collector 18. These parts, as best shown in Figure 2, are not mounted on the member 83 so that they are parallel to its sides, but are mounted at a slight diagonal. This is done so that as the contact 20 moves along the slidewire and collector there will be a slight wiping action which will tend to clean the slidewire and at the same time will cause the contact to wear evenly rather than form a groove in its surface.

In originally calibrating the instrument it is desirable to be able to shift the slidewire relative to the contact carried by the print wheel in order to adjust the zero of the instrument. To this end insulating plate 83 is so mounted that it can be shifted endwise relative to the bottom of the casing 76. For this purpose the casing is provided with a tongue 84 that is punched upwardly from its bottom plate 85 as best shown in Figure 3. A screw 86 is rotatably mounted in the tongue 84 and has below the tongue a disk 87 to which is attached an eccentric pin 88. This pin extends into a groove 89 that is cut into the insulating plate 83 and extends across the latter. In order to adjust the plate which carries the slidewire relative to the casing 76, the screw 86 is rotated to move the pin 88. As the pin, which bears in the groove 89, is shifted lengthwise, the slidewire assembly will be moved relative to the casing 76. The entire slidewire assembly and the casing 76 are rigidly fastened in place on the frame 72B by the means of the screw 81. When, for example, the casing 76 has been lifted upwardly around its pivots 79 for some purpose, such as cleaning the slidewire, it may be returned exactly to its original position by means of the screw 81. The conical head of the screw 81 cooperates with the groove 82 in the frame to pull the entire assembly tightly against the frame 72B to locate the same in some given position.

From the above description it will be seen that the slidewire and the resistances are mounted as a complete sub-assembly or unit so that they may be easily accessible and readily changed if necessary. It will also be seen that these parts are mounted adjacent each other so that they will remain at substantially the same temperature. Because the various parts are attached to or mounted within casing 76 and because of the fact that the casing is pivoted to frame 72, it will be seen that each time the casing is moved from its operative position it can be returned to exactly the same position relative to the frame. This insures that the instrument will not get out of calibration when the casing has been moved to clean or inspect the slidewire.

While in accordance with the provisions of the statutes I have illustrated and described the best forms of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is as follows:

1. In a mounting for the slide wire and auxiliary resistors of a potentiometer, said mounting locating the slide wire and the resistors close to one another and protecting them from changes in temperature, a frame adapted for mounting within the potentiometer casing, an inner casing having thin walls surrounding the resistors and providing a support for the slide wire on one of said walls, and means for locating said inner casing accurately with relation to said frame, said means including, a groove formed in said frame, and a shaft mounted on said inner casing having a conical face on it for engagement with the walls of said groove.

2. In a measuring instrument of the potentiometer type having a slide wire, a controller, and a plurality of calibrating and compensating resistances connected into a potentiometer network, a mounting for locating the slide wire and the resistances in a location of same temperature, said mounting including, a frame adapted to be pivotally mounted within the casing for the instrument and to form a chassis for supporting parts of the instrument thereon, an inner casing formed of a rectangular box of sheet metal having pivots projecting from its ends and journaled in said frame, supports having interengaging screw threads and attached to a wall of said inner casing for supporting said compensating and calibrating resistances within said inner casing, a sheet of insulation adjustably attached to one wall of said inner casing and having a groove therein, an eccentric mounted on a wall of said inner casing adjacent said insulation and having a part projecting into the said groove, whereby turning said eccentric adjusts said insulation relatively to said inner casing, and a cooperating groove and conical surfaced shaft mounted on said frame and on said casing for interengagement so as to locate said inner casing accurately relative to said frame.

JOHN A. CALDWELL.

REFERENCES CITED

The following references are of record in the file of this patent:

UNITED STATES PATENTS

| Number | Name | Date |
| --- | --- | --- |
| 819,355 | Leeds et al. | May 1, 1906 |
| 1,224,610 | Cumner et al. | May 1, 1917 |
| 1,661,535 | Haddock | Mar. 6, 1928 |
| 1,935,732 | Squibb | Nov. 21, 1933 |
| 2,185,562 | Nielson | Jan. 2, 1940 |
| 2,428,322 | Robertson et al. | Sept. 30, 1947 |